May 29, 1962 W. F. GAGNER 3,036,398
COLLAPSIBLE FISHING ROD
Filed Oct. 25, 1960
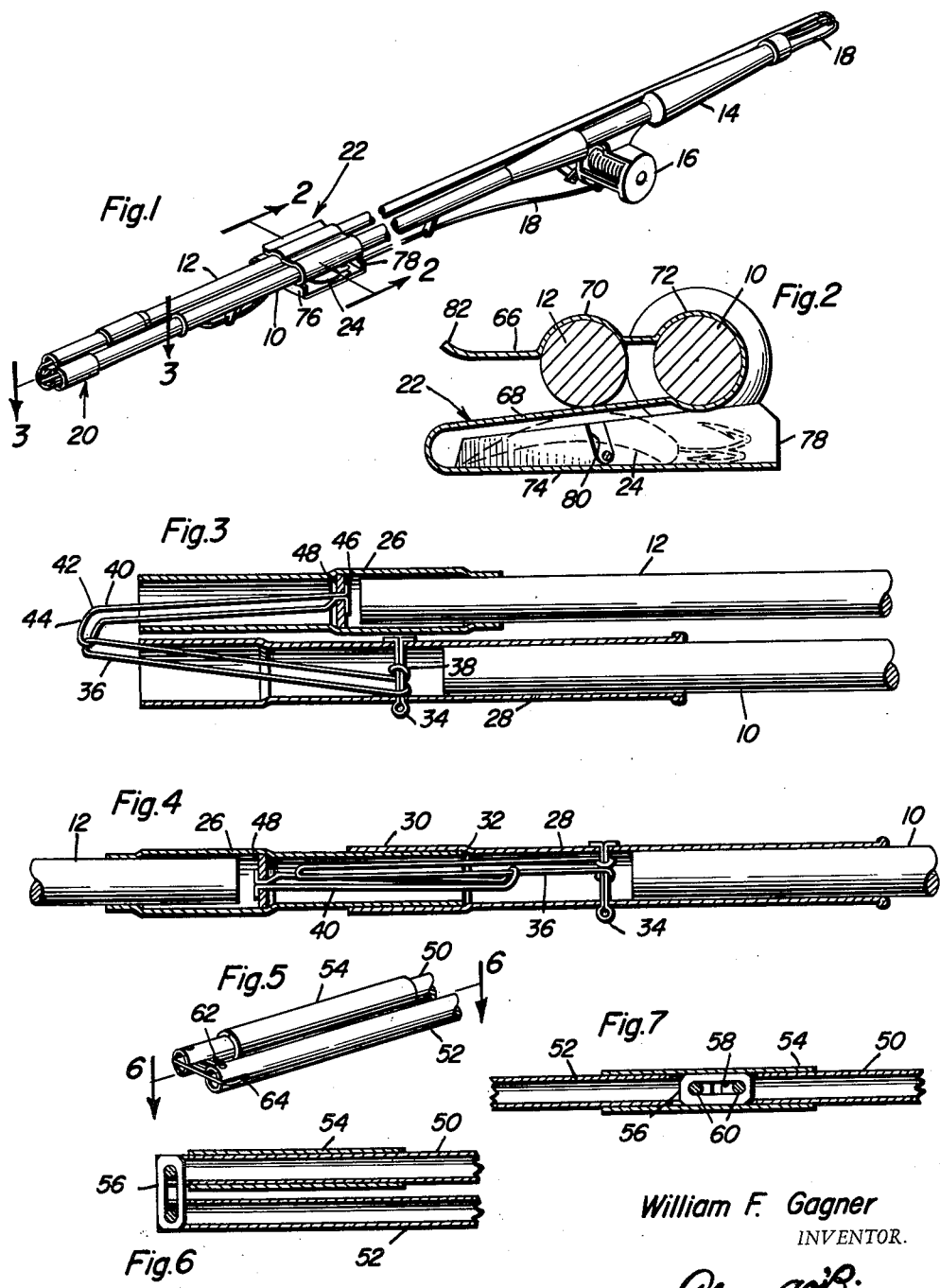
William F. Gagner
INVENTOR.

United States Patent Office

3,036,398
Patented May 29, 1962

3,036,398
COLLAPSIBLE FISHING ROD
William F. Gagner, 125 Irving Road, Eugene, Oreg.
Filed Oct. 25, 1960, Ser. No. 64,822
9 Claims. (Cl. 43—18)

This invention relates to fishing rods, and more specifically to collapsible fishing rods with means for holding the fishing rod in a collapsed condition and with provisions for holding and concealing the hook and bait on the fishing line of the rod.

Heretofore, there has been the objection to fishing rods that being large and flexible, they are awkward and difficult to carry and store. Also, there has been the objection that the hook and bait hanging from the line of the fishing rod swings freely from the rod and often becomes entangled with other objects and is therefore dangerous.

It is an object of this invention to provide means for collapsing a fishing rod, to provide means for holding the fishing rod in a collapsed condition and further to provide means for holding and concealing the fishing hook and bait.

Another object of this invention is to provide a novel and simple hinge arrangement for a fishing rod whereby provisions are provided on the hinge for uniting the rod into one rigid member or to separate the rod into a plurality of folded pieces with means for holding the pieces securely together while still maintaining them hinged.

Yet another object of this invention is to provide a clasp on the fishing rod for holding two sections of a fishing rod together after the rod has been folded or collapsed.

Another object of the invention is to provide a compartment on the clasp whereby the fishing hook and bait may be concealed therein to prevent the fishing hook from becoming entangled or hooked into foreign objects or living things.

Still another object of this invention is to provide a hinge and clasp device for a collapsible fishing rod that is durable in use and economical to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a collapsible fishing pole or rod showing the rod in the collapsed condition and with the two sections of the rod clamped together and with parts being broken away;

FIGURE 2 is an enlarged cross sectional view of the plane indicated by the section line 2—2 of FIGURE 1;

FIGURE 3 is a longitudinal sectional view through the novel hinge connection;

FIGURE 4 is a longitudinal sectional view of the hinge connection showing the two ends of the pole sections rigidly joined together;

FIGURE 5 is a perspective view of a modified form of the hinge connection;

FIGURE 6 is a longitudinal section through the modified construction shown in FIGURE 5 and taken on the plane of line 6—6 in FIGURE 5; and FIGURE 7 is a longitudinal sectional view of the hinge connection shown in FIGURES 5 and 6, but showing the sections of the pole rigidly joined together.

Referring to the drawings, and specifically to FIGURE 1, there is shown a collapsed fishing pole or rod comprising the two sections 10 and 12. The section 10 has a handle 14, and mounted adjacent the handle is a reel 16 having a fishing line 18 wound thereupon.

The two rod sections are joined together at their approximate center of the entire fishing rod by means of the novel hinge connection 20. Approximately midway between the hinge 20 and the reel 16 the two rod sections 10 and 12 are resiliently held together by means of a clamp 22. The lower portion of this clamp contains a compartment for retaining the bait and hook 24.

As shown more clearly in FIGURES 3 and 4, a preferred form of the hinge connection for the two rod sections comprise two telescoping tubular coupling members 26 and 28 fixed to the rod sections 12 and 10 respectively. The outer end of the coupling member 28 is enlarged as shown at 30. The beginning of the enlarged section 30 forms an annular ridge or abutment 32 so that when the sections 26 and 28 are telescoped together as shown in FIGURE 4, the outer end of section 26 will fit snugly in section 30 and abut against ridge 32. A cotter pin 34 extends through a radial opening in member 28 and the ends of the cotter pins are bent flush with the surface of sleeve 28.

A U-shaped hinge member 36 is inserted into the open end of sleeve 28 and its free ends are coiled around the cotter pin 34 at 38. Hooked through the U-shaped member 36, is a similar U-shaped member 40 which extends into the other sleeve member 26. The U-shaped members are preferably bent from wire. The central portion of the sleeve 26 is enlarged slightly to receive the washer 48. The washer 48 as shown in FIGURE 3, abuts against the end of this enlarged portion. The free ends of the U-shaped member 40 extend into sleeve 26 and through a hole in the washer 48. The free ends of the member 40 are bent flush against the back face of the washer at 46 so as to retain the U-shaped member 40 within sleeve member 26. The outer end of the U-shaped hinge member 40 is bent downwardly as shown in FIGURE 3 to form a portion 44 which is substantially normal to the body of the hinge member 40. The portion 44 of the hinge permits the rod sections 10 and 12 to be pivoted freely into a parallel position as shown in FIGURE 3. When the sleeve sections 26 and 28 are telescoped together to unite the two rod sections 10 and 12, the two U-shaped hinge elements 36 and 40 also are telescoped together as shown in FIGURE 4.

FIGURES 5, 6 and 7 show a modified form of my hinge connection connecting the two fishing rod sections 50 and 52. Each rod section has a substantially rectangular slot 62, 64 in the ends thereof. Extending into these slots is a link member 56 which is substantially rectangular in form and also has a substantially rectangular opening 58 through its central portion. The end of each rod section has a rivet 60 extending therethrough which is normal to the plane of the slots 62 and 64 and also extends through the opening 58 in the link member 56. Slidable on one of the rod sections, is a sleeve member 54 which has a snug sliding fit with the rod sections.

In operation of the modified form shown in FIGURES 5, 6 and 7, when it is desired to rigidly join the two sections 50 and 52, it is only necessary to align these two sections and the link member 56 by applying a tension thereto and then sliding the sleeve member over the link 56 as shown in FIGURE 8.

To firmly hold the two sections of the fishing rod together when they are in the folded condition and to prevent their unhinged ends from separating, there is applied to the two rod sections the resilient clip member 22. This resilient clip member is composed of some flexible material preferably metal such as aluminum or stainless steel in sheet form. As shown in FIGURE 2, the sheet material is formed into two substantially U-shaped chambers. The upper chamber comprises the legs 66 and 68 which have two enlarged recesses 70 and 72 therein for receiving the rod elements 12 and 10 respectively therein. The lower U-shaped chamber is formed by the legs 68 and 74 with the ends of the legs 74 bent upwardly to form walls 76 and 78 for enclosing the ends of this chamber. The walls 76 and 78 have U-shaped notches 80 therein. The arcuate portion 72 is resiliently urged against the tops of the flanges 76 and 78 as shown in FIGURE 2.

In operation, the clip member 22 may if desired be carried permanently on the rod member 10. Since the arcuate recess 72 is normally smaller in diameter than the rod section 10, the clip will resiliently engage and be retained on the rod section 10. When it is desired to fold and store the rod, first the telescoping sections 10 and 12 are disconnected and folded until they are parallel to one another and then the rod member 12 is forced into the recess 70. Due to the inherent resiliency of the material composing the clip member, the legs 66 and 68 of the clip member grip the rod sections tightly. The outer edge 82 of the leg member 66 is deflected upwardly to form a cam surface for easy entry of the rod sections. Once the rod is folded and clamped together by member 22, its length is decreased by approximately 50% and its two sections are firmly held together whereby it may be easily transported and stored.

The lower compartment in clip member 22 which is formed by legs 68 and 74 and walls 76 and 78 forms a convenient receptacle for storing the hook and bait or flies of the fishing rod. As shown in FIGURES 1 and 2, the bait or fly 24 may be stored in the lower compartment 22 and retained therein by means of the fishing line 18 which remains united or connected to the bait and hook 24. When the bait 24 is inserted into the lower compartment 22, at the same time, that portion of the fishing line 18 adjacent to the bait is forced between the cylindrical porion 72 and flange 78 and then inserted into the notch or recess 80. The recess 80 and the resilient interengagement between cylindrical member 72 and flange 78 constitute a holding means for the end of the line 18 and therefore prevents it and the bait or hook 24 from accidentally or inadvertently being dislodged from the lower compartment or clip 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a fishing rod comprising a plurality of sections having a fishing line attached at one end to a hook and means connecting the other end of the line to the rod, the improvement comprising a device for facilitating the compacting and storage of the rod comprising a hinge connecting the adjacent ends of each section, releasable connecting means adjacent the hinge adapted to be connected to the adjacent section ends for rigidly connecting the adjacent ends of each section, releasable fastening means spaced from the hinge including means for securing it to two adjacent substantially parallel sections whereby the rod may be firmly retained in a folded position by the hinge and the releasable fastening means and a compartment in the fastening means for retaining the hook and a bait whereby the hook and bait may be placed in said compartment while the fastening means is separated from the sections, and the fastening means may then be secured to said sections so as to apply tension on the line.

2. A device as defined in claim 1 and including a securing means for holding one end of the line and the hook and bait in the compartment, said securing means including a passage in said fastening means through which said line extends, and a resilient member integral with said fastening means and normally closing a lateral entrance to said passage.

3. In a fishing rod comprising a plurality of sections having a fishing line and hook attached thereto, a device for facilitating the compacting and storage of the rod comprising a hinge connecting the adjacent ends of each section, releasable connecting means adapted to be connected to adjacent section ends for rigidly connecting the adjacent ends of each section, releasable fastening means spaced from the hinge including means for securing it to two adjacent substantially parallel sections whereby the rod may be firmly retained in a folded position by the hinge and the releasable fastening means, each hinge comprising two interconnected U-shaped elements, each element connected to one of the section ends.

4. A device as defined in claim 3 wherein the hinge elements are composed of bent wire.

5. A device as defined in claim 3 wherein each releasable connecting means comprises two telescoping tubular members, each member containing one of the U-shaped elements and each member fixed to its respective rod section end.

6. In combination, a fishing rod divided into a plurality of sections, a fishing line on the rod, a hook and bait connected to one end of the line, a hinge loosely connecting the adjacent ends of each section, telescoping means on said adjacent ends for rigidly connecting the sections and supporting said hinge, fastening means comprising a resilient clip carried on one section having a recess therein for receiving an adjacent section when the rod is folded and a compartment in the clip for containing the hook and bait whereby the hook and bait may be placed in said compartment while the fastening means is separated from the sections, and the fastening means may then be secured to said sections so as to apply tension on the line after its other end is properly secured to the rod.

7. In a combination as defined in claim 6 wherein the resilient clip is U-shaped in cross section, said recess extending laterally across one leg of the U-shaped member, another recess in the base of the U-shaped member for receiving said one section and said compartment is carried by the other leg of the U-shaped member, said compartment being U-shaped in cross-section and defined by two generally parallel walls, one of said walls comprising said other leg.

8. In a fishing rod comprising a plurality of sections having a fishing line and hook attached thereto, a device for facilitating the compacting and storage of the rod comprising a hinge connecting the adjacent ends of each section, releasable connecting means adapted to be connected to adjacent section ends for rigidly connecting the adjacent ends of each section, releasable fastening means spaced from the hinge including means for securing the releasable fastening means to two adjacent substantially parallel sections whereby the rod may be firmly retained in a folded position by the hinge and the releasable fastening means, said releasable fastening means comprising a resilient clip which includes first, central and third legs arranged to form a member generally Z-shaped in cross-section, a pair of parallel grooves extending laterally across the first leg of the Z-shaped member for receiving sections of a fishing pole and a compartment fixed to the central leg of the Z-shaped member for receiving a hook and bait on the fishing pole, said compartment being defined by said central leg and the third leg which is generally parallel to the central leg and connected thereto by a bight portion, means connected to the resilient clip substantially closing opposite ends of the compartment.

9. A resilient clip comprising first, central and third legs arranged to form a member generally Z-shaped in cross-section, a pair of parallel grooves extending laterally across the first leg of the Z-shaped member for receiving sections of a fishing pole and a compartment fixed to the central leg of the Z-shaped member for receiving a hook and bait on the fishing pole, said compartment being defined by said central leg and the third leg which is generally parallel to the central leg and connected thereto by a bight portion, a flange secured to each end of said third leg and extending toward said middle leg, an aperture in one of the flanges for the passage of a fishing line therethrough, a portion of the middle leg normally engaging an edge of the flange having the aperture therein at a point spaced on the opposite side of said aperture from the bight portion.

References Cited in the file of this patent

UNITED STATES PATENTS

| | | |
|---|---|---|
| 72,667 | Montrose | Dec. 24, 1867 |
| 252,008 | Andrews | Jan. 10, 1882 |
| 1,601,572 | Lester | Sept. 28, 1926 |
| 1,816,301 | Sundell | July 28, 1931 |
| 2,590,249 | Horgard | Mar. 25, 1952 |
| 2,592,438 | Lawrenz | Apr. 8, 1952 |
| 2,849,825 | Reisner | Sept. 2, 1958 |